Dec. 6, 1927.
N. SENZUI
1,651,842
SWITCHING ARRANGEMENT
Filed March 29, 1927
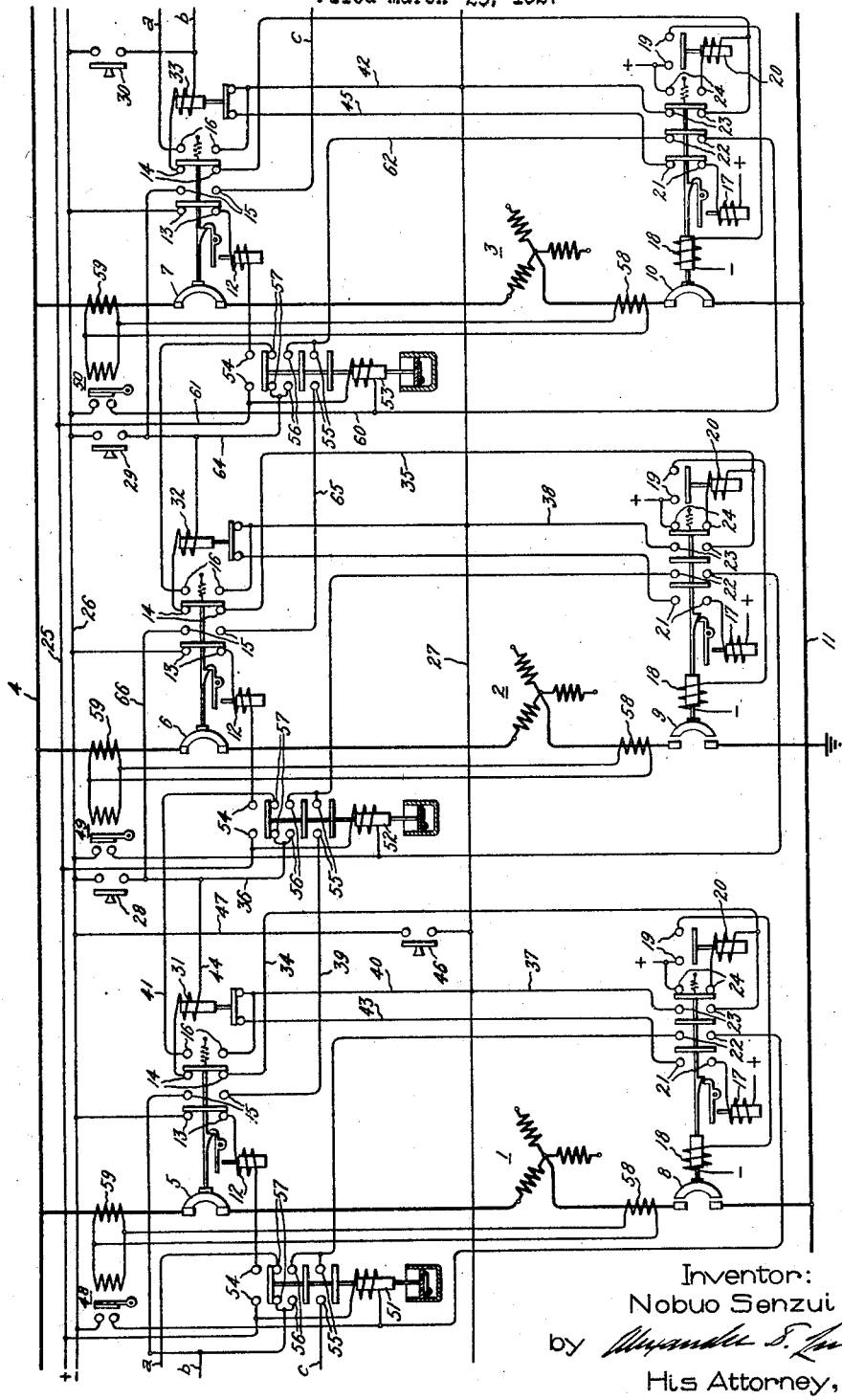
Inventor:
Nobuo Senzui,
by
His Attorney, Patented Dec. 6, 1927.

1,651,842

UNITED STATES PATENT OFFICE.

NOBUO SENZUI, OF KANAGAWAKEN, JAPAN, ASSIGNOR TO GENERAL ELECTRIC COMPANY, A CORPORATION OF NEW YORK.

SWITCHING ARRANGEMENT.

Application filed March 29, 1927, Serial No. 179,371, and in Japan May 19, 1926.

My invention relates to improvements in switching arrangements for electric systems having a station or stations where a plurality of dynamo-electric machines are to be operated in parallel and a system ground connection is desirable.

When a group of dynamo-electric machines, such as alternating current generators, synchronous condensers, or the like, are operated in parallel and the neutral of more than one is grounded, currents due to the third harmonic and multiples thereof tend to circulate in the windings of the grounded machines and thereby to cause useless loading and heating. Consequently, it is desirable that only one of the generators in service have its neutral point grounded, but when for any cause the grounded generator is taken from service, the ground connection should be transferred to another generator in service in order to avoid an ungrounded condition.

An object of my invention is to provide an improved switching arrangement whereby automatically to transfer the ground connection of a generator, when because of abnormal conditions in its circuit it must be taken from service, to another generator in service so as properly to maintain the system grounding.

My invention will be better understood from the following description taken in connection with the accompanying drawing and its scope will be pointed out in the appended claims.

The single figure of the accompanying drawing illustrates diagrammatically, in single phase for clearness, an embodiment of my invention in a switching arrangement for a plurality of polyphase dynamo-electric machines such as three phase generators 1, 2, 3. These are arranged to be connected in parallel to a supply bus 4 through suitable switches such as circuit breakers 5, 6, 7 and to have their neutral points grounded in any suitable manner as through suitable switches such as circuit breakers 8, 9, 10 which as shown are adapted to be operated to connect the neutral points to a ground bus 11. The ground bus may lead to earth either directly or through a current limiting device. The circuit breakers 5, 6, 7 as shown are of the latched closed type and are provided with suitable releasing means comprising trip coils 12 and of course with suitable closing mechanism which for the purpose of illustrating my invention it is unnecessary to show. For purposes hereinafter to appear, each of the circuit breakers 5, 6, 7 is provided with auxiliary switches comprising contacts 13, 14 which are arranged to be closed when the circuit breakers are closed and open when they are open and contacts 15, 16 which are arranged to be open when the circuit breakers are closed and vice versa. The circuit breakers 8, 9, 10 as shown are of the latched closed type and are provided with suitable releasing means comprising trip coils 17 and suitable closing means comprising closing coils 18. These closing coils may be arranged as shown to have their circuits controlled through the contacts 19 of closing relays 20 which as is well known may be of the instantaneous closing time delay opening type in order to allow time enough for the positive latching of the circuit breaker mechanism. Also for purposes hereinafter to appear, the circuit breakers 8, 9, 10 are provided with auxiliary switches comprising contacts 21, 22, 23 which are arranged to be closed when the circuit breakers are closed and open when they are open and contacts 24 which are arranged to be open when the circuit breakers are closed and vice versa. For energizing the trip and closing coils, the closing relays, and other devices, a suitable source such as positive and negative direct current control buses 25, 26 may be provided. There is also provided a tie control bus 27.

For controlling the circuit breakers 5 to 10 inclusive I provide an arrangement by which the circuit breakers are so interlocked that only one generator can remain connected to the ground bus 11 when more than one generator is connected to the supply bus 4 and that when only one generator is connected to the supply bus 4 the grounding circuit breaker of only that generator can be closed. This arrangement comprises normally open switches 28, 29, 30 which are manually controlled, auxiliary relays 31, 32, 33 and also certain of the circuit breaker auxiliary switches. The operation of this arrangement, as far as manual control is concerned will be explained on the assumption that the parts are positioned as shown in the drawing and that it is desired to change the ground connection from generator 3 to another generator in service such as generator 2 for example. The switch 29 is closed and completes a circuit as follows:—negative control bus 26, switch 29, auxiliary relay 32, contacts 14 of circuit breaker 6, conductor 35, and closing relay 20 and contacts 24 of the circuit breaker 9 to the positive side of the control bus as indicated by the plus sign. The auxiliary relay 32 and the closing relay 20 are thus energized. The latter through its contacts 19 completes the circuit of the closing coil 18 of the circuit breaker 9 to effect the closing thereof. The closing of this circuit breaker effects the opening of the circuit breaker 10 by completing its trip coil circuit as follows:—negative control bus 26, switch 29, auxiliary relay 32, contacts 14 of the circuit breaker 6, conductor 35, contacts 23 of the circuit breaker 9, conductor 38, tie bus 27, conductor 42, contacts of auxiliary relay 33, conductor 45, and contacts 21 and trip coil 17 of the circuit breaker 10 to the positive control bus as indicated by the plus sign. Consequently only one generator in service remains connected to the ground bus. It will be apparent that if it were not for the auxiliary relay 32 which opens its contacts when energized as by closing the switch 29, the circuit breaker 9 would be tripped open as soon as it was closed since its trip coil circuit would otherwise be completed by the closing of its contacts 21, 23. If the circuit breaker 6 were open, the closing of the switch 29 would not effect the closing of the circuit breaker 9 since the contacts 14 of the circuit breaker 6 would be open. If, however, the circuit breaker 5 were closed, the ground connection could be transferred from generator 3 to generator 1 by closing the switch 28, the circuits being analogous to those heretofore traced. If the circuit breaker 5 were open, the closing of the switch 28 would not effect the closing of the circuit breaker 8. In any case, only one generator in service remains grounded.

I may in some cases provide means for tripping the grounding switch of any generator without closing the grounding switch of another. As shown, this means comprises a switch 46 which when closed completes the circuit of the trip coil 17 of any one of the circuit breakers 8, 9, 10 which may be closed through the contacts of one of the auxiliary relays and the contacts 21 of the circuit breaker. If, for example, we assume that the circuit breaker 8 is closed, then on closing the switch 46 the circuit of the trip coil 17 of the circuit breaker 8 will be completed as follows:—negative control bus 26, conductor 47, switch 46, tie bus 27, conductor 40, contacts of the relay 31, conductor 43, and contacts 21 and trip coil 17 of the circuit breaker 8 to the positive side of the control bus.

In order automatically to control the paralleling and grounding switches or circuit breakers 5 to 10 inclusive so as to maintain the proper grounding on the occurrence of abnormal conditions in the circuit of a generator, I provide means which may be associated with each generator for opening both the paralleling and grounding switches thereof and closing the grounding switch of another generator in service but not in trouble.

This means as shown comprises protective relays 48, 49, 50 operative on the occurrence of abnormal conditions in the circuit of a generator to control suitable control device or relays 51, 52, 53 respectively which are of the instantaneous closing time delay opening type as indicated. Each of these control relays is arranged to control four circuits through four sets of contacts 54, 55, 56, 57, three of which are arranged to be closed and one open when the relay is deenergized and vice versa. The relays 48, 49, 50 are connected to be energized in accordance with the difference between the currents flowing in the ground and supply connections of their respective generators. For this purpose current transformers 58, 59, having their secondaries connected in a series circuit with the winding of the protective relay connected thereacross, may be employed.

Assuming again that the parts are positioned as shown in the drawing and that abnormal conditions occur in the circuit of generator 3 due for example to a ground fault on the primary or generator circuit between the current transformers 58 and 59, then if the difference between the currents in the secondaries of these transformers exceeds a predetermined value, the relay 50 will operate and close its contacts. The control relay 53 will be energized since its circuit is completed as follows:—negative control bus 26, contacts of relay 50, conductor 60, control relay 53, conductor 61, and positive control bus 25.

The relay 53 on closing its contacts 56 effects the closing of the circuit breaker 9 by completing the circuit of its closing relay 20 as follows:—negative control bus 26, contacts of relay 50, conductor 60, contacts 22 of the circuit breaker 10, conductor 62, contacts 56 of the relay 53, conductor 64, auxiliary relay 32, contacts 14 of the circuit breaker 6, conductor 35, and closing relay 20 and contacts 24 of the circuit breaker 9 to the positive control bus. The closing of the circuit breaker 9 and the contacts 56 of the control relay 53 effects the opening of the circuit breaker 10 by completing its trip coil circuit as follows:—negative control bus 26, contacts of relay 50, conductor 60, contacts 22 of the circuit breaker 10, conductor 62, contacts 56 of the control relay 53, conductor 64, auxiliary relay 32, contacts 14 of the circuit breaker 6, conductor 35, contacts 23 of the circuit breaker 9, conductor 38, tie bus 27, conductor 42, contacts of the auxiliary relay 33, conductor 45, and contacts 21 and trip coil 17 of the circuit breaker 10 to the positive control bus. The closing of the contacts 54 of the control relay 53 effects the opening of the circuit breaker 7 by completing its trip coil circuit as follows:—positive control bus 25, conductor 61, contacts 54 of the control relay 53, trip coil 12 and contacts 13 of the circuit breaker 7, and negative control bus 26.

It will now be assumed that the generator 2 is not in service, that is, the circuit breaker 6 is open but generator 1 is in service, that is, the circuit breaker 5 is closed as shown. Then if abnormal conditions occur on the circuit of the generator 3, the circuit for effecting the closing of the circuit breaker 8 is as follows:—negative control bus 26, contacts of the relay 50, conductor 60, contacts 22 of the circuit breaker 10, conductor 62, contacts 55 of the control relay 53, conductor 65, contacts 15 of the circuit breaker 6, conductor 66, winding of the auxiliary relay 31, contacts 14 of the circuit breaker 5, conductor 34, winding of the closing relay 20 and contacts 24 of the circuit breaker 8 to the positive control bus. Upon the closing of this circuit breaker, the trip coil circuit of the circuit breaker 10 will be completed as follows:—from the negative control bus 26 to conductor 34 as just traced, contacts 23 of the circuit breaker 8, conductor 37, tie bus 27, conductor 42, contacts of the auxiliary relay 33, conductor 45, and contacts 21 and trip coil 17 of the circuit breaker 10 to the positive control bus.

It will now be assumed that the generator 3 is the only one in service, then on operation of the relay 53 because of abnormal conditions, the trip coil circuit of the grounding circuit breaker 10 will be completed as follows:—negative control bus 26, contacts of the protective relay 50, conductor 60, contacts 22 of the circuit breaker 10, conductor 62, contacts 55 of the control relay 53, conductor 65, contacts 15 of the circuit breaker 6, conductors 66 and 36, contacts 57 of the control relay 52, conductor 41, contacts 16 of the circuit breaker 5, conductor 40, tie bus 27, conductor 42, contacts of the auxiliary relay 33, conductor 45, and contacts 21 and trip coil 17 of the circuit breaker 10 to the positive control bus.

Certain conductors shown open ended are lettered $a$, $b$, $c$ to indicate both that other apparatus similar to the units shown may be added and also that the free ends of these conductors would be joined according to their respective designations, that is, $a$ to $a$, $b$ to $b$, and $c$ to $c$. It will be apparent that the conductors $a$, $b$, $c$ are analogous to the conductors 41, 44 and 39 respectively. In view of this, the respective closing and tripping circuits for other combinations of generators in service, grounded or subject to abnormal conditions, will be readily traced by analogy to those herein set forth.

While I have shown and described my invention in considerable detail, I do not desire to be limited to the exact arrangement shown but seek to cover in the appended claims all those modifications that fall within the true spirit and scope of my invention.

What I claim as new and desire to secure by Letters Patent of the United States, is:

1. A plurality of dynamo-electric machines, switches for connecting said machines in parallel, switches for connecting said machines to ground, and means for controlling said switches comprising a control device arranged to be operated on the occurrence of abnormal conditions in the circuit of a machine to effect the opening of the paralleling and grounding switches thereof and the closing of the grounding switch of only a machine whose paralleling switch is closed.

2. A supply bus, a ground bus, a plurality of alternating current generators, means for connecting the generators to said busses, and means for controlling said connecting means comprising a control device arranged to be operated on the occurrence of abnormal conditions in the circuit of a machine to effect the disconnection thereof from said busses and the connection to the ground bus of another machine which is connected to the supply bus.

3. A plurality of dynamo-electric machines, means for connecting said machines in parallel, means for connecting said machines to ground and means for controlling said connecting means comprising a control device arranged to be operated on the occurrence of abnormal conditions in the circuit of a machine to effect the opening of the paralleling and grounding connecting means thereof and the closing of the grounding connecting means of another machine whose paralleling connecting means is closed.

4. A supply bus, a ground bus, a plurality of alternating current generators, means for connecting the generators to said busses, and means for controlling said connecting means comprising a relay connected to be energized in accordance with the difference between the currents in the ground and supply connections of a generator and a control device arranged to be controlled by said relay for effecting the disconnection of the generator from said busses when said difference exceeds a predetermined value and the connection to the ground bus of only a machine which is connected to the supply bus.

5. A supply bus, a ground bus, a plurality of alternating current generators, switches for connecting the generators to said busses so interlocked that only one generator can remain connected to the ground bus when more than one generator is connected to the supply bus and that when only one generator is connected to the supply bus the grounding switch of only the same generator can be closed, and means for controlling said switches comprising a relay operative on the occurrence of abnormal conditions in the circuit of a machine and a device controlled by said relay for effecting the disconnection of the machine from said busses and the connection to the ground bus of another machine which is connected to the supply bus.

6. A plurality of dynamo-electric machines, switches for connecting said machines in parallel, switches for connecting said machines to ground, said switches being so interlocked that only one grounding switch can remain closed while said machines are connected in parallel and that when the paralleling switch of only one machine is closed, the grounding switch of only the same machine can be closed, and means associated with each machine operative on the occurrence of abnormal conditions in the circuit of a machine to open both the paralleling and the grounding switches thereof and to close the grounding switch of another machine whose paralleling switch is closed comprising a control device and a relay operative in response to abnormal current conditions in the circuit of a machine to control said device.

In witness whereof, I have hereunto set my hand this twenty-third day of February, 1927.

NOBUO SENZUI.